US011486509B2

(12) United States Patent
Tsuchihashi (10) Patent No.: US 11,486,509 B2
(45) Date of Patent: Nov. 1, 2022

(54) CHECK VALVE, CHECK VALVE MECHANISM, AND HYDRAULIC SYSTEM (71) Applicant: HONDA MOTOR CO., LTD., Tokyo (JP)

(72) Inventor: Makoto Tsuchihashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/299,896

(22) PCT Filed: Sep. 25, 2019

(86) PCT No.: PCT/JP2019/037649
§ 371 (c)(1),
(2) Date: Jun. 4, 2021

(87) PCT Pub. No.: WO2020/115998
PCT Pub. Date: Jun. 11, 2020

(65) Prior Publication Data
US 2022/0025988 A1 Jan. 27, 2022

(30) Foreign Application Priority Data
Dec. 4, 2018 (JP) .............................. JP2018-227290

(51) Int. Cl.
F16K 15/18 (2006.01)
F16K 27/02 (2006.01)
(Continued)

(52) U.S. Cl.
CPC .......... F16K 27/0245 (2013.01); F15B 15/20 (2013.01); F16K 15/04 (2013.01)

(58) Field of Classification Search
CPC .............................. F16K 15/04; F16K 27/0245
(Continued)

(56) References Cited

U.S. PATENT DOCUMENTS 1,859,479 A * 5/1932 Thwaits .................... A01J 9/06
220/745
2,924,335 A * 2/1960 Nickols ................... F16K 15/04
210/97
(Continued)

FOREIGN PATENT DOCUMENTS

JP 2004-286184 A 10/2004
JP 2005-172114 A 6/2005
(Continued)

OTHER PUBLICATIONS

PCT/ISA/210 from International Application PCT/JP2019/037649 with the English translation thereof.

Primary Examiner — P. Macade Nichols
(74) Attorney, Agent, or Firm — Carrier Blackman & Associates, P.C.; Joseph P. Carrier; Jeffrey T. Gedeon (57) ABSTRACT Provided are a check valve which can be easily mounted, a check valve structure which includes the check valve, and a hydraulic system which has the check valve structure. A check valve structure includes a partition wall for defining a first hole including a part of a hydraulic passage, and also includes a check valve inserted in the first hole, wherein the check valve structure is provided with: a base body having a base section which closes an open end of the first hole, and having a tubular section which has one end connected to the base section; and a sphere capable of making contact with the other end of the tubular section. The tubular section has formed therein a first through-hole communicating with a second hole connected to the first hole.

7 Claims, 5 Drawing Sheets (51) Int. Cl.
*F15B 15/20* (2006.01)
*F16K 15/04* (2006.01)

(58) Field of Classification Search
USPC .................................. 137/533.11, 533.13
See application file for complete search history.

(56) References Cited

U.S. PATENT DOCUMENTS

| | | | |
|---|---|---|---|
| 10,174,852 B2 * | 1/2019 | Arian | ............... F16K 15/1826 |
| 2004/0206403 A1 | 10/2004 | Saitou et al. | |
| 2010/0269928 A1 * | 10/2010 | Ford | .................. F16K 15/04 |
| | | | 137/533.19 |

FOREIGN PATENT DOCUMENTS

| | | |
|---|---|---|
| JP | 2014-040111 A | 3/2014 |
| JP | 2014-077461 A | 5/2014 |
| JP | 2017-166499 A | 9/2017 |

* cited by examiner

CHECK VALVE, CHECK VALVE MECHANISM, AND HYDRAULIC SYSTEM

TECHNICAL FIELD

The present invention relates to a check valve, a check valve structure (check valve mechanism), and a hydraulic system.

BACKGROUND ART

A hydraulic system is appropriately equipped with a check valve and the like. In Japanese Laid-Open Patent Publication No. 2014-077461, a hydraulic control circuit is disclosed which is equipped with a check valve in order to prevent aeration.

SUMMARY OF INVENTION

However, cases may occur in which the check valve does not necessarily operate in a suitable manner. In such cases, it may be considered to make a design change. However, if such a design change is made accompanied by a drastic change in the layout, an enormous cost may be required.

An object of the present invention is to provide a check valve that is capable of being easily provided, a check valve structure in which the check valve is included, and a hydraulic system having such a check valve.

A check valve structure according to one aspect of the present invention is characterized by a check valve structure comprising: a partition wall defining a first hole that includes a portion of a liquid passage; and a check valve inserted into the first hole, the check valve including: a base body including a base portion configured to close an open end of the first hole, and a tubular portion, one end of which is connected to the base portion; and a spherical body configured to be brought into abutment against another end of the tubular portion, wherein a first through hole configured to communicate with a second hole connected to the first hole is formed in the tubular portion.

A hydraulic system according to another aspect of the present invention comprises the check valve structure as was described above.

A check valve according to still another aspect of the present invention is characterized by a check valve inserted into a first hole that includes a portion of a liquid passage, the check valve comprising: a base body including a base portion configured to close an open end of the first hole, and a tubular portion, one end of which is connected to the base portion; and a spherical body configured to be brought into abutment against another end of the tubular portion, wherein a first through hole configured to communicate with a second hole connected to the first hole is formed in the tubular portion.

According to the present invention, it is possible to provide a check valve that is capable of being easily provided, a check valve structure in which the check valve is included, and a hydraulic system having such a check valve.

DESCRIPTION OF EMBODIMENTS

Preferred embodiments of a check valve, a check valve structure, and a hydraulic system according to the present invention will be presented and described in detail below with reference to the accompanying drawings.

EMBODIMENT

Figure 1:
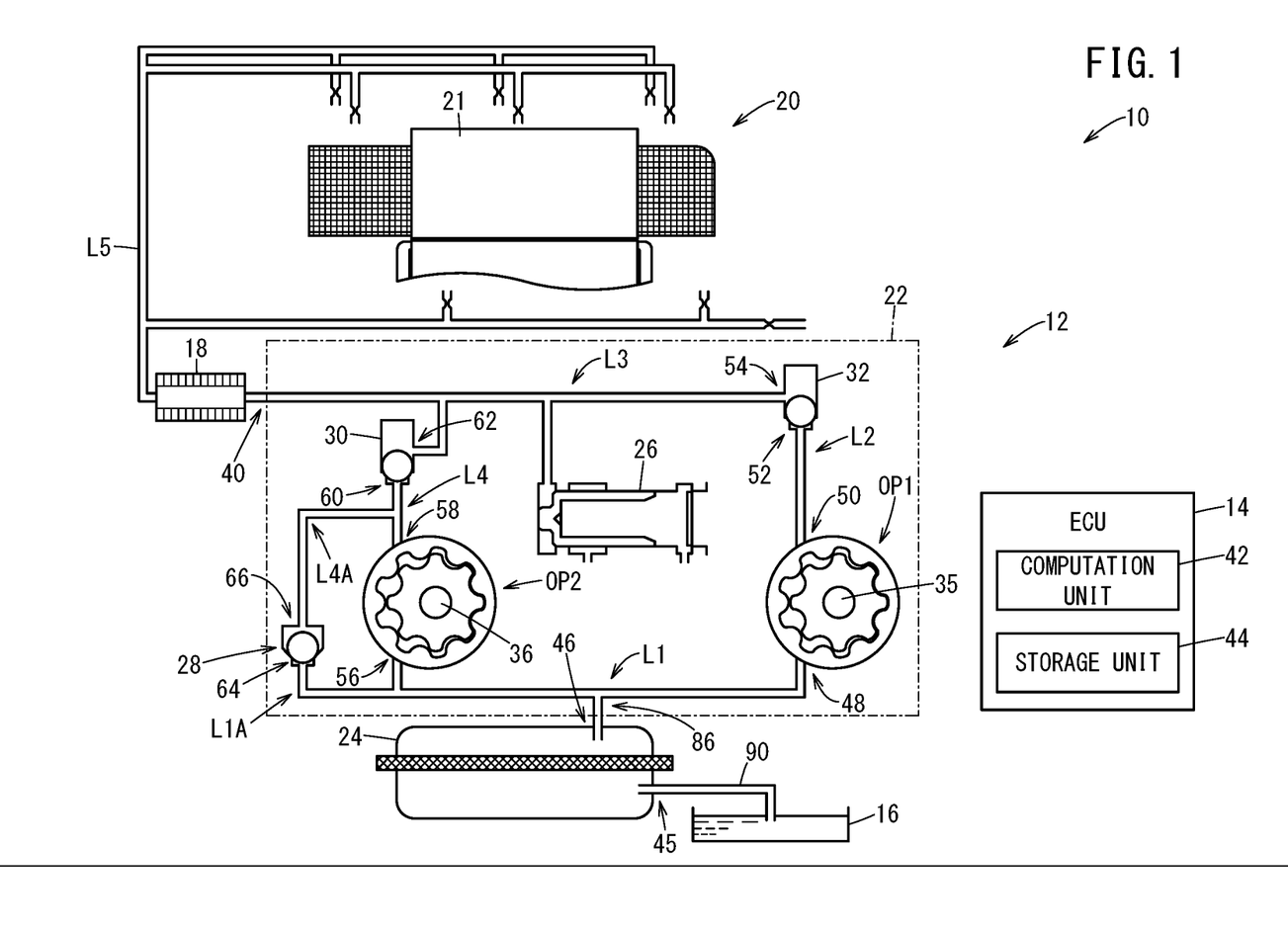
FIG. 1 is a block diagram showing a vehicle equipped with a hydraulic system according to an embodiment.
Figure 2:
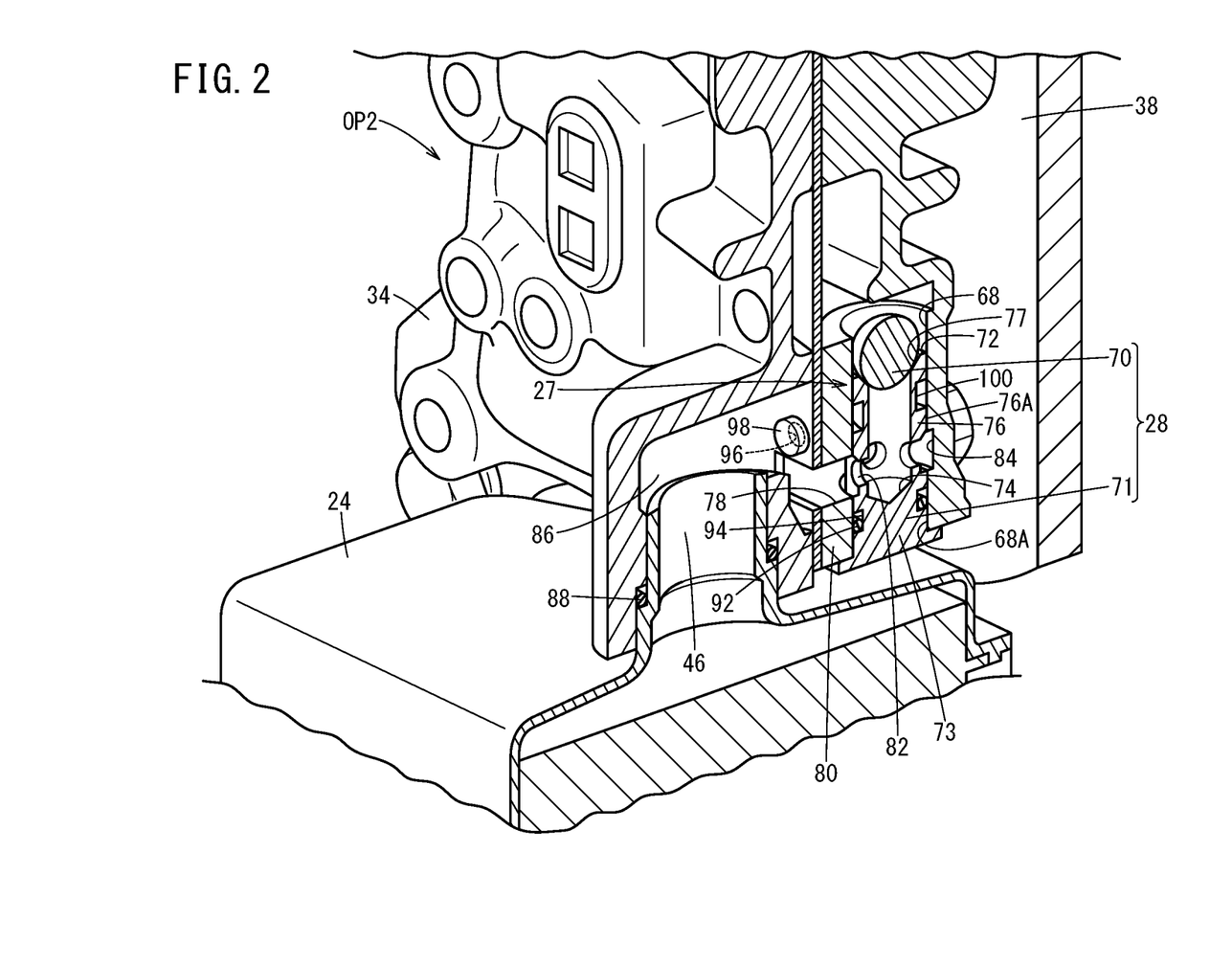
FIG. 2 is a cross-sectional view showing a portion of the hydraulic system which is equipped with a check valve according to the embodiment.
Figure 3:
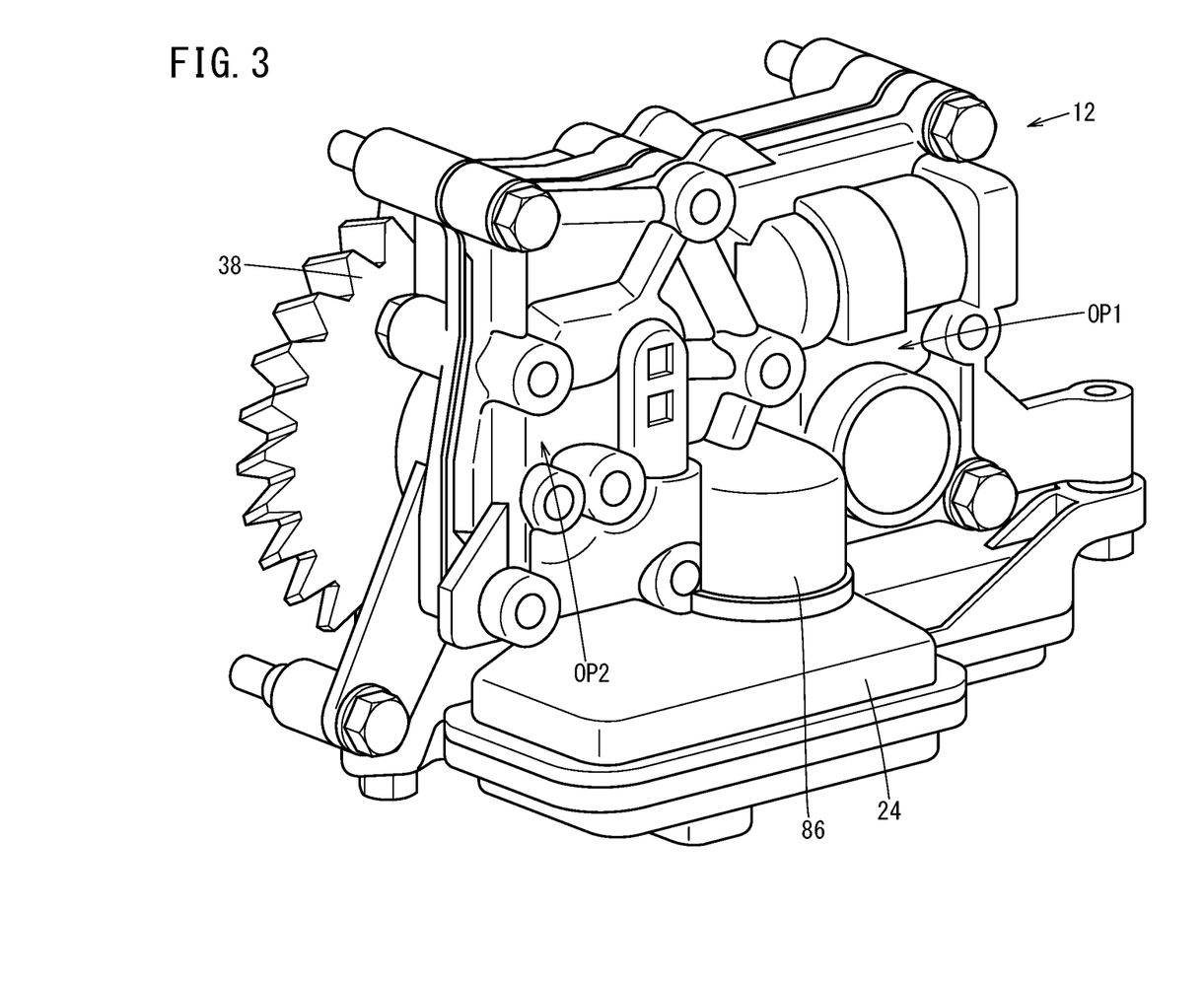
FIG. 3 is a perspective view showing the hydraulic system according to the embodiment.
Figure 4:
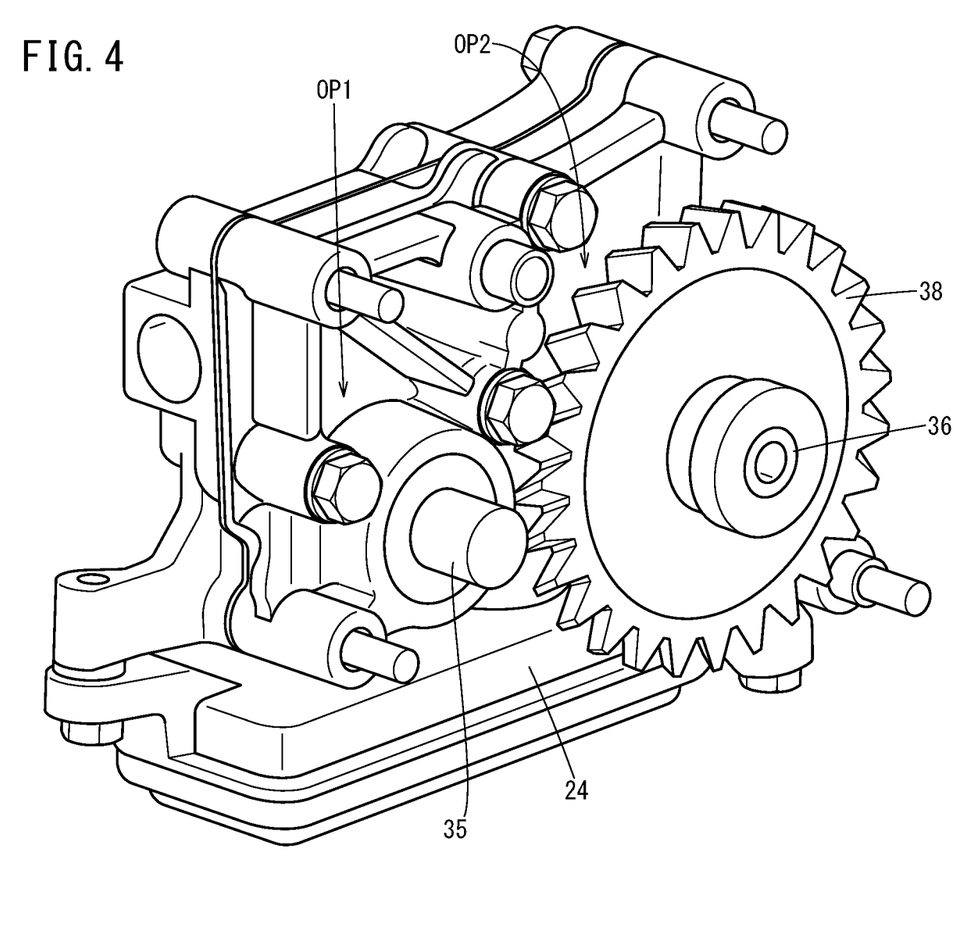
FIG. 4 is a perspective view showing the hydraulic system according to the embodiment.

A check valve, a check valve structure, and a hydraulic system according to one embodiment will be described with reference to the drawings. FIG. 1 is a block diagram showing a vehicle equipped with the hydraulic system according to the present embodiment. FIG. 2 is a cross-sectional view showing a portion of the hydraulic system which is equipped with a check valve according to the present embodiment. FIGS. 3 and 4 are perspective views showing the hydraulic system according to the present embodiment.

As shown in FIG. 1, a vehicle 10 is equipped with a hydraulic system 12 according to the present embodiment, an ECU (Electronic Control Unit) 14, a liquid pan 16, a liquid cooler 18, and a cooled portion 20. Although the vehicle 10 is equipped with other constituent elements apart from those noted above, description of such elements is omitted herein. Moreover, in this instance, although an exemplary case is described in which oil is used as an energy transfer medium, the present invention is not limited to this feature. A liquid other than oil can be appropriately used as the energy transfer medium.

The hydraulic system (fluid pressure supply device, oil pressure supply device) 12 is provided with a fluid pressure circuit (oil pressure circuit) 22, and a strainer 24. The fluid pressure circuit 22 is equipped with two liquid pumps (oil pumps), namely, a first liquid pump OP1 and a second liquid pump OP2. The fluid pressure circuit 22 is further provided with a relief valve 26, and check valves 28, 30, and 32. In the fluid pressure circuit 22, there are provided liquid passages L including a first liquid passage L1, a second liquid passage L2, a third liquid passage L3, a fourth liquid passage L4, a branching liquid passage L1A, and a branching liquid passage L4A. When descriptions are given in general concerning the liquid passages (oil passages), the reference numeral L will be used, and when descriptions are given specifically concerning each of the liquid passages, the reference numerals L1 to L5, L1A, and L4A will be used. The liquid passages L are defined by a partition wall 80 (see FIG. 2) of a housing 34 (see FIG. 2) of the hydraulic system 12.

The first liquid pump OP1 is driven by a non-illustrated electric motor. A drive shaft (pump shaft) 35 (see FIG. 4) of the first liquid pump OP1 is driven by a non-illustrated electric motor.

The second liquid pump OP2 is driven accompanied by rotation of a drive shaft (axle) of the vehicle 10. A liquid pump gear 38 (see FIG. 4) which is fixed to a drive shaft 36 (see FIG. 4) of the second liquid pump OP2 is enmeshed with a non-illustrated final driven gear. When the vehicle 10 is moving forward, the second liquid pump OP2 rotates, for example, in a positive direction, and when the vehicle 10 is moving rearward, the second liquid pump OP2 rotates, for example, in a reverse direction.

A liquid cooler (oil cooler) 18 is connected to a discharge port 40 of the fluid pressure circuit 22. The liquid (oil), which is discharged from the discharge port 40 of the fluid pressure circuit 22, is cooled by the liquid cooler 18. The liquid cooled by the liquid cooler 18 is supplied to the cooled portion 20 via a fifth liquid passage L5. The cooled portion 20 includes, for example, a motor 21 or the like. Moreover, although in this instance, an exemplary case has been described in which the discharge port 40 of the fluid pressure circuit 22 is connected to the liquid cooler 18, the present invention is not necessarily limited to such a configuration.

The ECU 14 includes a computation unit 42 and a storage unit 44. The computation unit 42 is provided, for example, with a CPU (Central Processing Unit). The storage unit 44 is provided, for example, with a nonvolatile memory and a volatile memory. As an example of the nonvolatile memory, there may be cited a ROM (Read Only Memory), a flash memory, or the like. As an example of the volatile memory, there may be cited a RAM (Random Access Memory) or the like. Various arithmetic programs executed by the computation unit 42 are stored in the storage unit 44. Further, various tables, computation results, and the like are stored in the storage unit 44. The motor 21 and the fluid pressure circuit 22 are controlled by the ECU 14.

The liquid that is stored in the liquid pan 16 is supplied to the strainer 24 using a liquid intake pipe 90. One end of the liquid intake pipe 90 is positioned on the side of the liquid pan 16. Another end of the liquid intake pipe 90 is connected to an intake port 45 of the strainer 24.

A discharge port (discharging portion) 46 of the strainer 24 is connected to an intake port (intake portion) 86 of the fluid pressure circuit 22. The discharge port 46 of the strainer 24 and the intake port 86 of the fluid pressure circuit 22 are sealed by a packing 88 (see FIG. 2). As shown in FIG. 3, the intake port 86 of the fluid pressure circuit 22 is positioned, as a whole, between the liquid pump OP1 and the liquid pump OP2.

The discharge port 46 of the strainer 24 communicates with an intake port 48 of the first liquid pump OP1 via the intake port 86 and the first liquid passage L1. A discharge port 50 of the first liquid pump OP1 communicates with an intake port 52 of the check valve 32 via the second liquid passage L2. A discharge port 54 of the check valve 32 is connected to the third liquid passage L3. When the first liquid pump OP1 is driven, the liquid is pumped from the liquid pan 16. The liquid that is pumped from the liquid pan 16 is supplied to the liquid cooler 18 and the like via the strainer 24, the first liquid passage L1, the first liquid pump OP1, the second liquid passage L2, the check valve 32, and the third liquid passage L3.

The discharge port 46 of the strainer 24 communicates with an intake port 56 of the second liquid pump OP2 via the intake port 86 and the first liquid passage L1. A discharge port 58 of the second liquid pump OP2 communicates with an intake port 60 of the check valve 30 via the fourth liquid passage L4. A discharge port 62 of the check valve 30 is connected to the third liquid passage L3. When the vehicle 10 is moving forward, the second liquid pump OP2 rotates in a positive direction. When the second liquid pump OP2 rotates in the positive direction, the liquid is pumped from the liquid pan 16. The liquid that is pumped from the liquid pan 16 is supplied to the liquid cooler 18 and the like via the strainer 24, the first liquid passage L1, the second liquid pump OP2, the fourth liquid passage L4, the check valve 30, and the third liquid passage L3.

The intake port 56 of the second liquid pump OP2 communicates with an intake port 64 of the check valve 28 via the branching liquid passage L1A that is branched from the first liquid passage L1. The discharge port 58 of the second liquid pump OP2 communicates with a discharge port 66 of the check valve 28 via the branching liquid passage L4A that is branched from the fourth liquid passage L4.

When the vehicle 10 is moving rearward, the second liquid pump OP2 rotates in a reverse direction. When the second liquid pump OP2 rotates in the reverse direction, the liquid in the fourth liquid passage L4 is drawn in from the discharge port 58 of the second liquid pump OP2, the pressure in the fourth liquid passage L4 becomes a negative pressure, and the check valve 28 is opened. Upon doing so, the liquid in the branching liquid passage L1A is discharged from the discharge port 66 of the check valve 28. The liquid that is discharged from the discharge port 66 of the check valve 28 is supplied to the second liquid pump OP2 via the branching liquid passage L4A, the fourth liquid passage L4, and the discharge port 58. The liquid supplied to the second liquid pump OP2 is supplied to the check valve 28. In this manner, circulation of the liquid is performed. When the vehicle 10 is moving rearward, the liquid is circulated in this manner. Therefore, even when the vehicle 10 is moving rearward, it is possible to prevent a negative pressure from being generated in the branching liquid passage L4A, and to suppress the load on the second liquid pump OP2. Therefore, it is possible to prevent a situation in which lubrication by the liquid is insufficient.

As shown in FIG. 2, a check valve structure 27 according to the present embodiment includes the partition wall 80 defining a hole 68 that includes a portion of the liquid passages L, and the check valve 28 that is inserted into the hole 68. The hole 68, for example, is a vertical hole. More specifically, a longitudinal direction of the hole 68 is a vertical direction. The hole 68 is not limited to being a vertical hole. However, from the standpoint of obtaining the check valve 28 which is capable of reliably operating, the hole 68 is preferably a vertical hole. In this instance, an exemplary case will be described in which the hole 68 is a vertical hole.

One end of the hole 68, namely, the lower end of the hole 68, reaches a surface of the housing 34, and more specifically, the lower surface of the housing 34. An open end 68A of the hole 68 is positioned on the lower surface of the housing 34. The check valve 28 is positioned, as a whole, between the liquid pump OP1 and the liquid pump OP2.

Another end of the hole 68, and more specifically an upper portion of the hole 68, corresponds to the discharge port 66 of the check valve 28. The upper portion of the hole 68 is connected to the branching liquid passage L4A. The hole 68 is connected to a hole (a second hole) 78, between the upper portion of the hole 68 and the lower portion of the hole 68. The hole 78, for example, is a lateral hole. More specifically, a longitudinal direction of the hole 78 is a horizontal direction. It should be noted that the hole 78 is not limited to being a lateral hole. The hole 78 corresponds to the intake port 64 of the check valve 28. The hole 78 constitutes another portion of the liquid passages L.

The check valve 28 includes a base body (main body) 71, and a spherical body 70. The base body 71 closes the open end 68A of the hole 68. The spherical body 70 is arranged inside the hole 68, and is supported by the base body 71. The base body 71 includes a base portion 73 and a tubular portion 76. The base portion 73 is positioned on the lower end of the hole 68. The base portion 73 and the tubular portion 76 are formed in an integral manner. A side wall 76A of the tubular portion 76 has a cylindrical shape, for example. One end of the tubular portion 76 is closed by the base portion 73, and thereby forms a closed end 74. Another end of the tubular portion 76 forms an open end 72. In the vicinity of the open end 72, the inner diameter of the side wall 76A of the tubular portion 76 gradually increases as it becomes closer in proximity to the open end 72. Stated otherwise, a tapered surface 77 is formed at the open end 72. The spherical body 70 can be brought into abutment against the other end of the tubular portion 76, and more specifically, against the open end 72 of the tubular portion 76. The diameter of the spherical body 70 is set to be greater than the inner diameter of the tubular portion 76 at the open end 72. The spherical body 70 can be brought into abutment against the tapered surface 77 that is formed at the open end 72.

A groove 94 in order to enable arrangement of a packing 92 is formed in the base portion 73. The packing 92 is provided inside the groove 94. The base portion 73 and the inner wall of the hole 68 are sealed by the packing 92.

A plurality of through holes (first through holes) 82 are formed in the side wall 76A of the tubular portion 76. The plurality of through holes 82 are arranged in a circumferential direction of the tubular portion 76. A groove (first groove) 84 that communicates with the hole 78 is formed in a circumferential direction of the inner wall of the hole 68. Stated otherwise, the groove 84 is formed in an annular shape as a whole. The groove 84 communicates with the hole 78. The hole 78 penetrates through the partition wall 80 of the housing 34. Among the plurality of through holes 82, the through hole 82 that faces toward the hole 78 communicates directly with the hole 78. Among the plurality of through holes 82, the through holes 82 that do not face toward the hole 78 communicate with the hole 78 via the groove 84. Since the through holes 82 communicate with the hole 78, the liquid, which is supplied to the hole 78 that corresponds to the intake port 64, is supplied to the inner side of the tubular portion 76 via the through holes 82. When the liquid is supplied to the inner side of the tubular portion 76, the spherical body 70 is lifted by the liquid, and the check valve 28 is opened. As noted previously, the upper portion of the hole 68 corresponds to the discharge port 66. By the check valve 28 being opened, the liquid is discharged through the discharge port 66.

A through hole (second through hole) 96 is formed in the partition wall 80 that defines the hole 68. A groove 100, into which a distal end of a member 98 inserted into the through hole 96 is inserted, is formed on an outer surface side of the side wall 76A of the tubular portion 76. The member 98 serves to prevent the base body 71 from falling out from the hole 68.

In the foregoing manner, the hydraulic system 12 is constituted having the check valve structure 27 in which the check valve 28 is included.

In the foregoing manner, according to the present embodiment, the check valve structure 27 is constituted by inserting the spherical body 70 and the base body 71 into the hole 68 that includes a portion of the liquid passages L. Therefore, according to the present embodiment, the check valve 28 can be easily provided.

In addition, the hole 68 can be formed by making a design change to an existing hole in a manner so as to reach the lower surface of the housing 34. Therefore, according to the present embodiment, the check valve 28 can be provided without being accompanied by a significant change in design.

Moreover, according to the present embodiment, since the spherical body 70 is brought into abutment against the upper end of the tubular portion 76, the check valve 28 can operate in a reliable manner. Thus, according to the present embodiment, a satisfactory hydraulic system 12 can be provided.

Modified Embodiments

Although a preferred embodiment of the present invention has been described above, the present invention is not limited to the above-described embodiment, and various modifications can be made thereto without departing from the essence and gist of the present invention.

Figure 5:
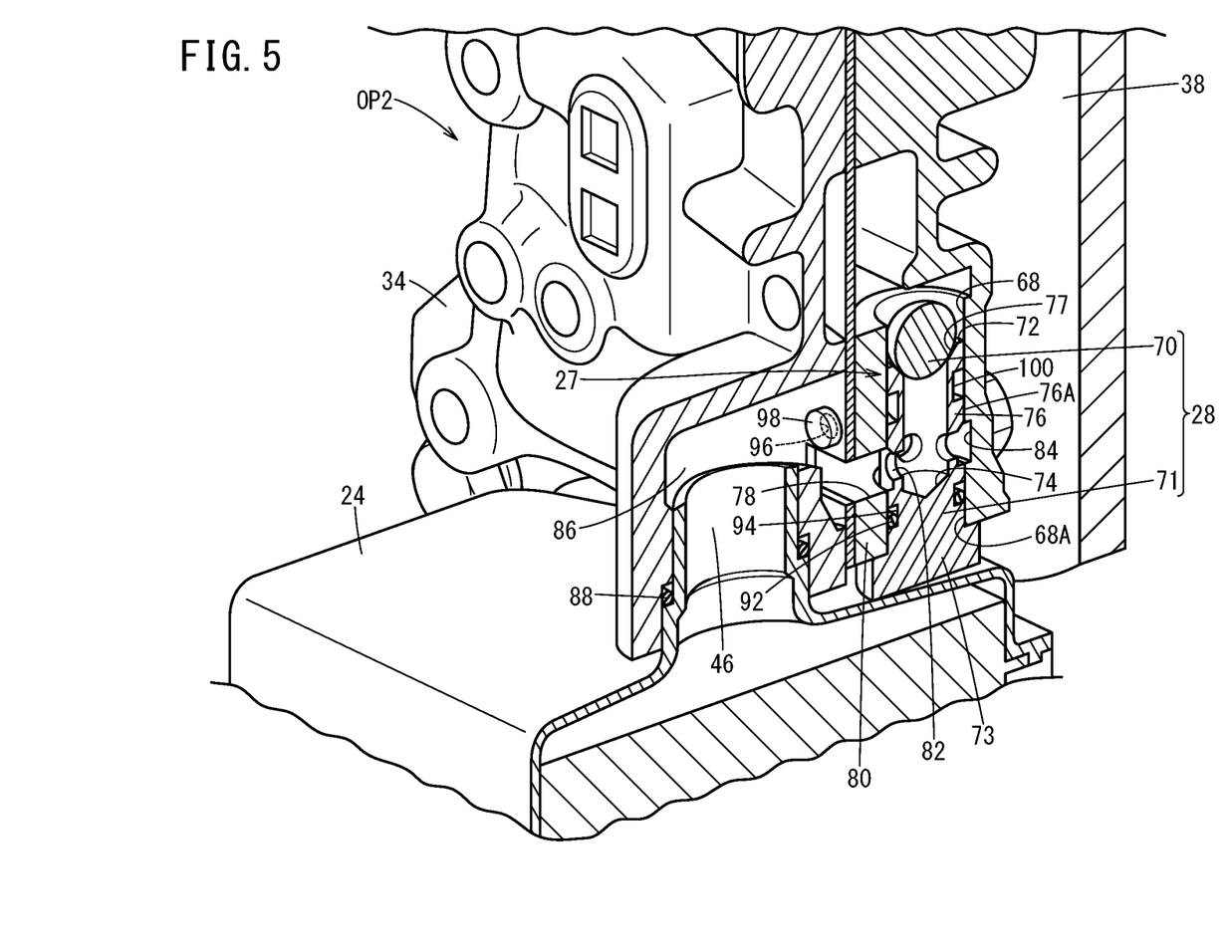
FIG. 5 is a cross-sectional view showing a portion of the hydraulic system which is equipped with a check valve according to a modified embodiment.

For example, as shown in FIG. 5, within the base portion 73, the thickness of a site that is positioned on an outer side of the hole 68 may be made larger. More specifically, a lower surface of the base portion 73 may be placed in contact with an upper surface of the strainer 24, or the lower surface of the base portion 73 may be placed in close proximity to the upper surface of the strainer 24. FIG. 5 is a cross-sectional view showing a portion of the hydraulic system which is equipped with the check valve according to a modified embodiment. If the lower surface of the base portion 73 is placed in contact with the upper surface of the strainer 24, even in the case that the member 98 falls out, the base body 71 remains supported by the strainer 24, and the base body 71 is not shifted toward the lower side. Further, if the lower surface of the base portion 73 is placed in close proximity to the upper surface of the strainer 24, the base body 71 is supported by the strainer 24 in a state in which the base body 71 is slightly shifted toward the lower side. Since the base body 71 is not shifted excessively toward the lower side, communication between the through holes 82 and the hole 78 is ensured, and the check valve 28 is capable of operating normally. In the foregoing manner, within the base portion 73, the thickness of the site that is positioned on the outer side of the hole 68 may be made larger.

Further, in the above-described embodiment, although an exemplary case has been described in which the longitudinal direction of the hole 68 is the vertical direction, the present invention is not necessarily limited to this feature. If the longitudinal direction of the hole 68 intersects the horizontal direction, it is still possible to obtain the check valve structure 27 which is capable of operating in a comparatively satisfactory manner.

Further, in the above-described embodiment, although an exemplary case has been described in which the longitudinal direction of the hole 78 is the horizontal direction, the present invention is not necessarily limited to this feature. However, the longitudinal direction of the hole 78 intersects the longitudinal direction of the hole 68.

Summarizing the embodiments described above, the following features and advantages are realized.

The check valve structure (27) is characterized by a check valve structure comprising the partition wall (80) that defines the first hole (68) that includes a portion of the liquid passages (L), and the check valve (28) inserted into the first hole, the check valve including: the base body (71) including the base portion (73) that closes the open end (68A) of the first hole, and the tubular portion (76), one end of which is connected to the base portion; and the spherical body (70) which is capable of being brought into abutment against the other end of the tubular portion, wherein the first through holes (82), which communicate with the second hole (78) connected to the first hole, are formed in the tubular portion. In accordance with such a configuration, the check valve structure is formed by inserting the base body and the spherical body into the first hole. Therefore, in accordance with such a configuration, the check valve can be easily provided.

The longitudinal direction of the first hole may be a direction that intersects the horizontal direction, the longitudinal direction of the second hole may be a direction that intersects the longitudinal direction of the first hole, the open end may be positioned at a bottom part of the first hole, and the spherical body may be disposed on the other end of the tubular portion. In accordance with such a configuration, since the spherical body is arranged on the other end of the tubular portion, the check valve structure which is capable of operating in a suitable manner can be obtained.

The second hole may be connected to the first hole between one end of the first hole and another end of the first hole.

A plurality of the first through holes, which are arranged in a circumferential direction of the tubular portion, may be formed in the tubular portion, the first groove (84) that communicates with the second hole may be formed in the inner wall of the first hole in the circumferential direction of the inner wall of the first hole, and at least one of the plurality of first through holes may communicate with the second hole through the first groove. In accordance with such a configuration, at least one of the plurality of first through holes can be reliably made to communicate with the second hole.

The second through hole (96) may be formed in the partition wall that defines the first hole, and the second groove (100), into which the distal end of the member (98) inserted into the second through hole is inserted, may further be formed in the tubular portion. In accordance with such a configuration, it is possible to reliably prevent the base body from falling out from the first hole.

The hydraulic system (12) comprises the check valve structure as was described above.

The check valve is characterized by a check valve that is inserted into the first hole that includes a portion of the liquid passage, the check valve comprising: the base body including the base portion that closes the open end of the first hole, and the tubular portion, one end of which is connected to the base portion; and the spherical body which is capable of being brought into abutment against the other end of the tubular portion, wherein the first through holes, which communicate with the second hole connected to the first hole, are formed in the tubular portion.

REFERENCE SIGNS LIST

10 . . . vehicle
12 . . . hydraulic system
14 . . . ECU
16 . . . liquid pan
18 . . . liquid cooler
20 . . . cooled portion
21 . . . motor
22 . . . fluid pressure circuit
24 . . . strainer
26 . . . relief valve
27 . . . check valve structure
28, 30, 32 . . . check valve
34 . . . housing
35, 36 . . . drive shaft
38 . . . liquid pump gear
40, 46, 50, 54, 58, 62, 66 . . . discharge port
42 . . . computation unit
44 . . . storage unit
45, 48, 52, 56, 60, 64, 86 . . . intake port
68, 78 . . . hole
68A, 72 . . . open end
70 . . . spherical body
71 . . . base body
73 . . . base portion
74 . . . closed end
76 . . . tubular portion
76A . . . side wall
77 . . . tapered surface
80 . . . partition wall
82, 96 . . . through hole
84, 94, 100 . . . groove
88, 92 . . . packing
90 . . . liquid intake pipe
98 . . . member
L1 to L5 . . . liquid passage
L1A, L4A . . . branching liquid passage
OP1, OP2 . . . liquid pump

The invention claimed is:

1. A check valve structure comprising: a partition wall defining a first hole that includes a portion of a liquid passage; and a check valve inserted into the first hole,
the check valve including: a base body including a base portion and a tubular portion provided as a single component, the base portion being configured to close an open end of the first hole, and one end of the tubular portion extending from the base portion; and a spherical body configured to be brought into abutment against another end of the tubular portion,
wherein a first through hole configured to communicate with a second hole connected to the first hole is formed in the tubular portion.

2. The check valve structure according to claim 1, wherein:
a longitudinal direction of the first hole is a direction that intersects a horizontal direction;
a longitudinal direction of the second hole is a direction that intersects the longitudinal direction of the first hole;
the open end is positioned at a bottom part of the first hole; and
the spherical body is disposed on the another end of the tubular portion.

3. The check valve structure according to claim 1, wherein the second hole is connected to the first hole between one end of the first hole and another end of the first hole.

4. The check valve structure according to claim 1, wherein:
a plurality of the first through holes, which are arranged in a circumferential direction of the tubular portion, are formed in the tubular portion;
a first groove configured to communicate with the second hole is formed in an inner wall of the first hole in a circumferential direction of the inner wall of the first hole; and
at least one of the plurality of first through holes communicates with the second hole through the first groove.

5. The check valve structure according to claim 1, wherein:
a second through hole is formed in the partition wall defining the first hole; and
a second groove, into which a distal end of a member inserted into the second through hole is inserted, is further formed in the tubular portion.

6. A hydraulic system comprising a check valve structure including: a partition wall defining a first hole that includes a portion of a liquid passage; and a check valve inserted into the first hole,
  the check valve including: a base body including a base portion and a tubular portion provided as a single component, the base portion being configured to close an open end of the first hole, and one end of the tubular portion extending from the base portion; and a spherical body configured to be brought into abutment against another end of the tubular portion,
  wherein a first through hole configured to communicate with a second hole connected to the first hole is formed in the tubular portion.

7. A check valve inserted into a first hole that includes a portion of a liquid passage, the check valve comprising:
  a base body including a base portion and a tubular portion provided as a single component, the base portion being configured to close an open end of the first hole, and one end of the tubular portion extending from the base portion; and
  a spherical body configured to be brought into abutment against another end of the tubular portion,
  wherein a first through hole configured to communicate with a second hole connected to the first hole is formed in the tubular portion.

* * * * *